June 26, 1928.
H. J. GOLDTHWAITE
1,675,026
ILLUMINATING DEVICE FOR AUTOMOBILE HOODS
Filed Feb. 21, 1924   2 Sheets-Sheet 1
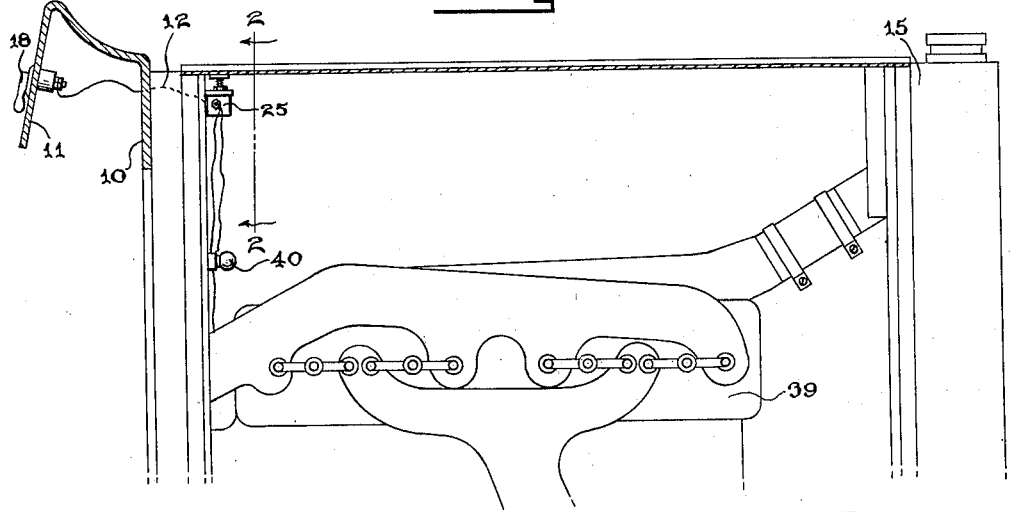
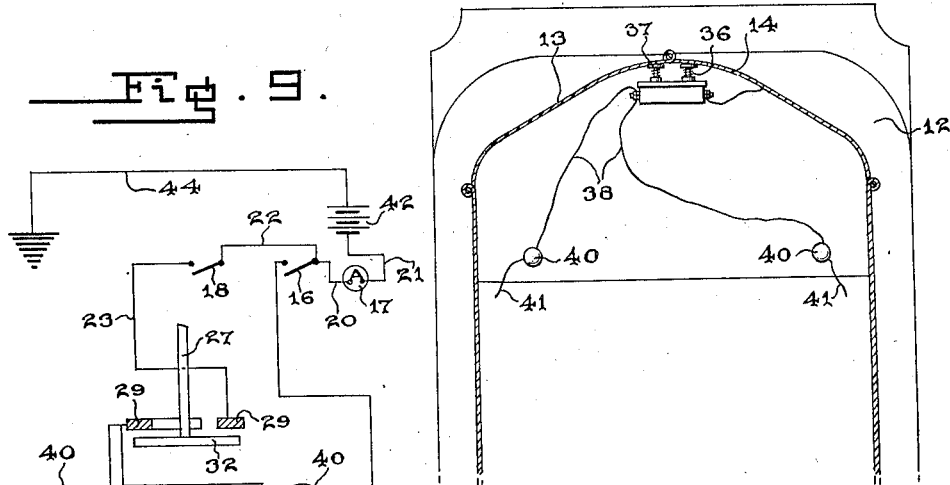
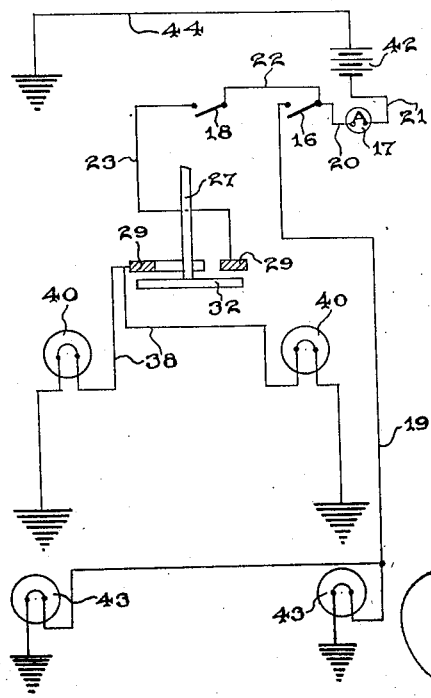
Inventor
Herbert J. Goldthwaite June 26, 1928.
H. J. GOLDTHWAITE
ILLUMINATING DEVICE FOR AUTOMOBILE HOODS
Filed Feb. 21, 1924
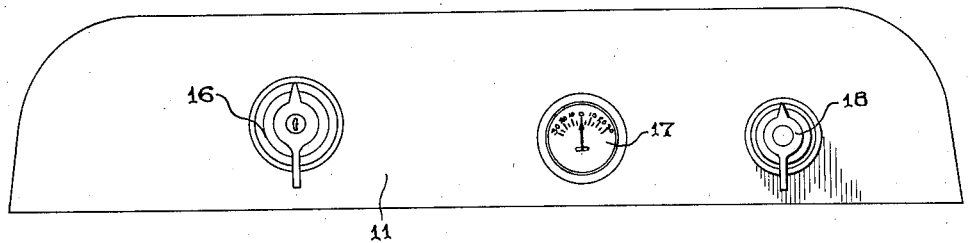
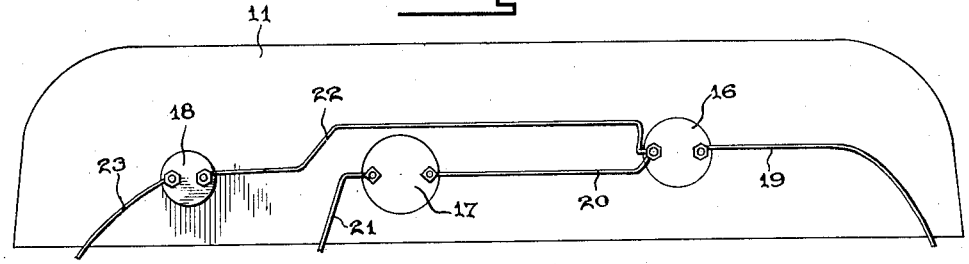
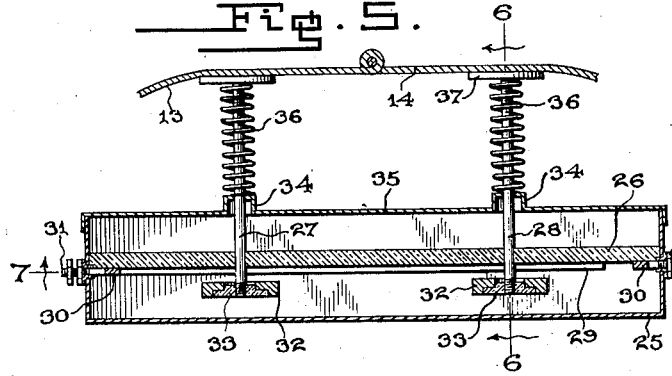
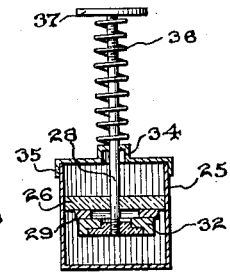
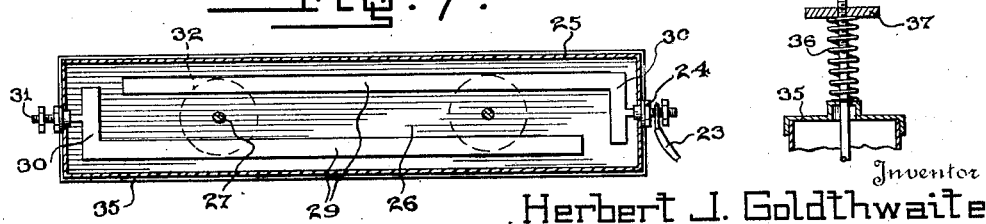
Inventor
Herbert J. Goldthwaite Patented June 26, 1928.

1,675,026

UNITED STATES PATENT OFFICE.

HERBERT J. GOLDTHWAITE, OF ST. AUGUSTINE, FLORIDA.

ILLUMINATING DEVICE FOR AUTOMOBILE HOODS.

Application filed February 21, 1924. Serial No. 694,376.

The present invention relates to lighting devices particularly for application to motor vehicles and the like.

An object of this invention is to provide an attachment of this character which may be arranged beneath the hood of an automobile and associated with the hood in such a manner as to automatically illuminate the engine and adjacent parts when either one or both sides of the hood are raised or removed.

Another object of the invention is to provide a lighting circuit including one or more lamps for positioning beneath the hood of an automobile and also including a manually operable switch and automatically operable switches controlled by the raising and lowering of opposite sides of the hood for automatically lighting the lamps when the hood is opened and for extinguishing the lamps when the hood is closed, thus preventing the accidental burning of the lamps when not needed.

A further object of the invention is to provide a circuit as above set forth which has the manually operable switch connected through the positive terminal of the usual ignition switch of an automobile so as to include the ammeter of the motor vehicle and thus obtain a reading as to current consumption and a check on short circuits should any occur in the lighting system of this invention.

A further object of the invention is to provide an improved double circuit closer adapted to be located beneath the opposite side portions of the hood and which is adjustable to accommodate the circuit closer to various positions beneath the hood and to hoods of various heights and configurations.

The above and various other objects and advantages of this invention will in part be described in and in part understood from the following detailed description of the present preferred embodiment, the same being illustrated in the accompanying drawings, wherein:

Fig. 1 is a side elevation partly in section of the forward end of a motor vehicle showing an automatic lighting device constructed according to the present invention applied thereto.

Fig. 2 is a transverse section through the same taken substantially on the line 2—2 of Fig. 1.

Fig. 3 is a face view of the instrument board of the usual automobile.

Fig. 4 is a rear view of the same.

Fig. 5 is an enlarged longitudinal sectional view taken through the double circuit closer of the invention in position beneath the opposite side portions of a hood.

Fig. 6 is a transverse section taken vertically through the same.

Fig. 7 is a horizontal longitudinal section taken through the double circuit closer substantially on the line 7—7 of Fig. 5.

Fig. 8 is a fragmentary transverse section similar to Fig. 6 but showing one of the plunger members shortened, and Fig. 9 is a diagrammatic view of the electric circuits employed.

Referring to the drawings 10 designates the dash board of an automobile provided with an instrument board 11, a cowl 12 and a hood composed of the sections 13 and 14 which extends from the cowl 12 to the radiator 15. The instrument board 11, as shown in Fig. 3 has the usual combined lighting and ignition switch 16, and ammeter 17 and a manually operable lighting switch 18 which comprises a portion of this invention.

As shown in Fig. 4 the combined lighting and ignition switch has a ground lead 19 which extends to the ignition and lighting devices and is provided with a positive feed wire 20 which leads to one side of the ammeter 17, and the latter is connected by a wire 21 to the battery or other source of electrical energy of the vehicle. The manual lighting switch 18 is provided with a positive lead 22 which extends from the positive connecting post of the combined switch 16 so as to include the lead 22 in circuit with the ammeter 17. The switch 18 has a wire 23 which leads outwardly beneath the hood and is connected to a binding post 24 of the double circuit closer.

The double circuit closer comprises a casing 25 provided intermediate its top and bottom with an electric insulating plate 26 forming a guide for a pair of stems 27 and 28 which are arranged to slide vertically through the spaced openings of the plate 26. Beneath the plate 26 is arranged a pair of parallel contact strips 29 having angled end portions 30 which engage across the inner ends of the casing 25 and one of which is connected to the binding post 24 while the other is connected to an opposite end binding post 31. The binding posts 24 and 31 extend outwardly through the opposite ends of the casing 25.

The stems 27 and 28 are located near the opposite ends of the casing 25 and are each provided upon its lower end with a contact disk 32 of ring form having a central core 33 of electric nonconducting material and which latter is threaded or otherwise suitably secured to its stem. The upper ends of the stems 27 and 28 project through bosses 34 which are raised upon a cover 35 which is closely fitted over the top of the casing 25, and the stems 27 and 28 project upwardly beyond the bosses and carry helical springs 36 which rest at their lower ends upon the bosses 34. The stems 27 and 28 are threaded at their upper ends and receive thereon bearing disks 37 against which the upper ends of the springs are adapted to work for normally urging the stems with their contact disks 32 upwardly. The casing 25, as shown in Figs. 1 and 2, is adapted to be positioned beneath the hood near the top thereof so that one of the disks 37 engage beneath one of the hood sections such as 13, and the other disk 37 engages beneath the opposite section 14 of the hood. The stems 27 and 28 are of such length that when the hood sections 13 and 14 are lowered, the stems are depressed sufficiently to remove the contact disks 32 from the bars 29 to open the circuit through the double switch. Either one or both of the disks 32 may be raised to complete the circuit.

The binding post 31 is preferably connected to a pair of wires 38 which extend to opposite sides of the engine 39 beneath the hood and which are connected to lamps 40 which are suitably grounded through wires 41. Thus when one of the contact disks 32 is permitted to rise under influence of its spring 36 the circuit through both lamps 40 is closed so that the entire engine and its parts are illuminated. These lamps 40 may also be interchanged with the head or other lights on a motor vehicle and serve as a ready and convenient means of carrying a supply of incandescent lamps for emergency use.

In Fig. 8 the disk 37 is shown as turned down upon the stem 28 to lower the disk 37 such as when the casing 25 is located up close to the top of the hood. The exposed upper end of the stem 28 is adapted to be broken or cut off above the disk and the remaining upper end of the stem is adapted to be upset in order to lock the disk to the stem.

In Fig. 9 the diagram of the circuits is shown wherein the battery 42 is connected by the wire 21 to the ammeter 17 and the latter has the wire 20 which leads to the switch 16. The switch 16 is connected to one end of the wire 19 which leads through the head lights 43 or the like and thence is grounded. The battery 42 is grounded through the wire 44 as shown. The switch 16 also has the wire 22 which leads to the manually operable switch 18 to which wire 23 is connected. The wire 23 extends to one of the contact bars 29 while the other contact bar is engaged by the divided circuit wires 38 which include the lamps 40 which are grounded.

It is apparent that when the device is in use and the hood closed the double switch is open and the hand switch 18 is also supposed to be open. If the hand switch is closed, by accident or from neglect, the automatic double switch will open the circuit and prevent waste of current by the burning of the lamps 40 when the hood is closed.

When one of the hood sections, 13 or 14, is raised the corresponding stem, 27 or 28, is lifted by its spring 36 and brings the contact disk 32 against the under sides of the contact bars 29, closing the circuit through the double switch. If the manual switch 18 is closed the lamps 40 will be lighted. As soon as the hood section is lowered back into place, the circuit is broken in the double switch and the lamps 40 are extinguished.

It is of course understood that various changes and modifications may be made in the details of construction and design of the above specifically described embodiment of the invention without departing from the spirit thereof, such changes and modifications being restricted only by the scope of the following claims.

What is claimed is:

1. The combination with the engine and hood of an automobile, said hood including two independently movable closure members pivotally mounted above the engine, of an electrically operated illuminating device disposed at each side of the engine to direct their rays of light thereupon, and a switch in the hooded compartment for controlling said electrically operated illuminating devices, said switch operated by the opening of either of said hingedly mounted closure members.

2. The combination with the engine and hood of an automobile, said hood including two independently movable closure members pivotally mounted above the engine, of an electrically operated illuminating device disposed at each side of the engine to direct their rays of light thereupon, and a switch in the hooded compartment adjacent the pivots of said closure members, and including a member for each of said closure members, bearing thereagainst when in a closed position, and either operable by the opening of its respective closure member to complete a circuit through said electrically operated illuminating devices, to illuminate both sides of the engine.

3. The combination with a structure providing a compartment including two hingedly mounted closure members disposed with their hinged portions next adjacent to one another, of an electrically operated illuminating device disposed in the compartment closed by said closure members, and a switch in said compartment for controlling said electrically operated illuminating device, said switch operable by the opening of either of said hingedly mounted closure members.

4. The combination with a structure providing a compartment, including two hingedly mounted closure members disposed with their hinged portions next adjacent to each other, of an electrically operated illuminating device disposed in the compartment closed by said closure members, and a switch in said compartment adjacent the pivots of said closure members, and including a member for each of said closure members, bearing thereagainst when in a closed position, and either operable by the opening of its respective closure member to complete an electric circuit through said illuminating device.

HERBERT J. GOLDTHWAITE.